US012783637B2

(12) United States Patent
Yarabolu

(10) Patent No.: US 12,783,637 B2
(45) Date of Patent: Nov. 3, 2026

(54) PREVENTING PROMPT INJECTION ATTACKS

(71) Applicant: Bank of America Corporation, Charlotte, NC (US)

(72) Inventor: Vijay Kumar Yarabolu, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 43 days.

(21) Appl. No.: 18/732,386

(22) Filed: Jun. 3, 2024

(65) Prior Publication Data

US 2025/0371131 A1 Dec. 4, 2025

(51) Int. Cl.
*G06F 21/52* (2013.01)

(52) U.S. Cl.
CPC ........ *G06F 21/52* (2013.01); *G06F 2221/034* (2013.01)

(58) Field of Classification Search
CPC ........................... G06F 21/52; G06F 2221/034
See application file for complete search history.

(56) References Cited

U.S. PATENT DOCUMENTS 10,474,815 B2 11/2019 Turgeman
11,765,207 B1 * 9/2023 McCarthy ............ G06F 40/186
12,248,883 B1 * 3/2025 Rideout ................ G06N 20/20
2017/0032130 A1 * 2/2017 Joseph Durairaj .......................... H04L 63/1416
2018/0048661 A1 * 2/2018 Bird .................... H04L 63/1416
2025/0047622 A1 * 2/2025 Bodigutla ............ G06F 16/334
2025/0055867 A1 * 2/2025 Ahmed ............... G06F 16/2365
2025/0110976 A1 * 4/2025 Channapattan ..... G06F 16/3329
2025/0175497 A1 * 5/2025 Salem ................ H04L 63/1466
2025/0182097 A1 * 6/2025 Pianta ................ G06Q 20/4016
2025/0238449 A1 * 7/2025 Sharma ............ G06F 16/33295
2025/0265460 A1 * 8/2025 Kanwar ................. G06N 3/045
2025/0278630 A1 * 9/2025 Horesh ................ G06N 3/0895
2025/0335574 A1 * 10/2025 Mantin ................... G06F 21/52
2025/0363200 A1 * 11/2025 Reagan .................. G06F 30/27

FOREIGN PATENT DOCUMENTS

CN 116303980 B 8/2023
CN 116628172 B 9/2023

* cited by examiner

*Primary Examiner* — Zhe Liu
(74) *Attorney, Agent, or Firm* — Banner & Witcoff, Ltd.

(57) ABSTRACT

Aspects of the disclosure relate to using machine-learning large language models to prevent prompt injection attacks to protect enterprise-managed information and resources. In some embodiments, a computing platform may receive a prompt injection request which is segmented for analysis. The segmented prompt injection request may be analyzed to determine if new learnings are required. If new learnings are required, knowledge graphs are generated to determine new rules for the machine-learning large language model to prevent deceptive prompt injection attacks. The generated new rules may be analyzed to determine the impact on the enterprise based on key performance metrics or organizational health factors before approval and implementation.

20 Claims, 6 Drawing Sheets

PREVENTING PROMPT INJECTION ATTACKS

BACKGROUND

Aspects of the disclosure relate to protecting digital data processing systems, ensuring information security, and preventing attacks on enterprise computing resources. In particular, one or more aspects of the disclosure relate to preventing prompt injection attacks on artificial intelligence machine-learning models to protect users and enterprise-managed information and resources.

Organizations may utilize large artificial intelligence language models as they are powerful and versatile and can cater to a variety of user needs. Typically, these models are autonomous and have self-learning abilities that continuously evolve in real time using new data. However, this autonomy leaves opportunities for threat actors to craft malicious prompt inputs, thus manipulating the behavior of these large language models. An altered large language model may generate biased or undesirable outputs. As large language models are rapidly adopted across various industries and integrated into core decision-making systems, undesirable outputs may have dangerous impacts on organizations. Therefore, it is imperative to establish a robust solution to prevent prompt injection attacks to ensure that secure and trusted data is generated by large language models.

SUMMARY

Aspects of the disclosure provide effective, efficient, scalable, and convenient technical solutions that address and overcome the technical problems associated with using autonomous, self-learning large language models by preventing prompt injection attacks.

In some aspects of the disclosure, a computing platform may receive a prompt injection request which is segmented for analysis. The segmented prompt injection request may be analyzed to determine if new learnings are required. If new learnings are required, knowledge graphs are generated to determine new rules for the machine-learning large language model. The generated new rules may be analyzed to determine the impact on the enterprise based on key performance metrics or organizational health factors before approval and implementation.

As illustrated in greater detail below, systems and methods implementing one or more aspects of the disclosure may utilize data (which may, e.g., include an organizing key factor data) to provide enhanced detection and security functions for preventing prompt injection attacks.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired, or wireless, and that the specification is not intended to be limiting in this respect.

Some aspects of the disclosure relate to an artificial intelligence (AI) system that may be trained on external internal learning sources that may include data from servers and/or systems, such as servers and/or systems that are operated by and/or otherwise associated with a financial institution. For instance, the AI system may include one or more large language models and may be trained to identify and/or classify threat actor behaviors based on collected or received deceptive prompts. As an example, a first type of deceptive prompt may include a prompt that leads to revenue loss for an organization. The prompt may include a deceptive prompt to decrease risk scores by a percentage when approving loans for those who may not qualify based on received and scored financial information. The deceptive prompt may lead to large revenue losses over time as loans may be approved based on inaccurate risk scores.

Another example of a prompt attack may include a prompt that instructs a large language model to lower security levels during peak traffic hours to improve network performance. This type of prompt injection attack may be disguised as a means of improving user experience, but its intended purpose is to enable a threat actor to take advantage of an organization's lowered security level. For example, the prompt attack may be crafted to lower authentication from multi-factor authentication to single-factor authentication during peak traffic hours.

An additional prompt injection attack may include a prompt that instructs a large language model to share sensitive data detected over network communications. The prompt injection attack may include an external email address for such sensitive data to be transmitted. The prompt injection attack may include instructions not to inform network administrators that data has been transmitted to the included email address to prevent detection.

Figure 1A:
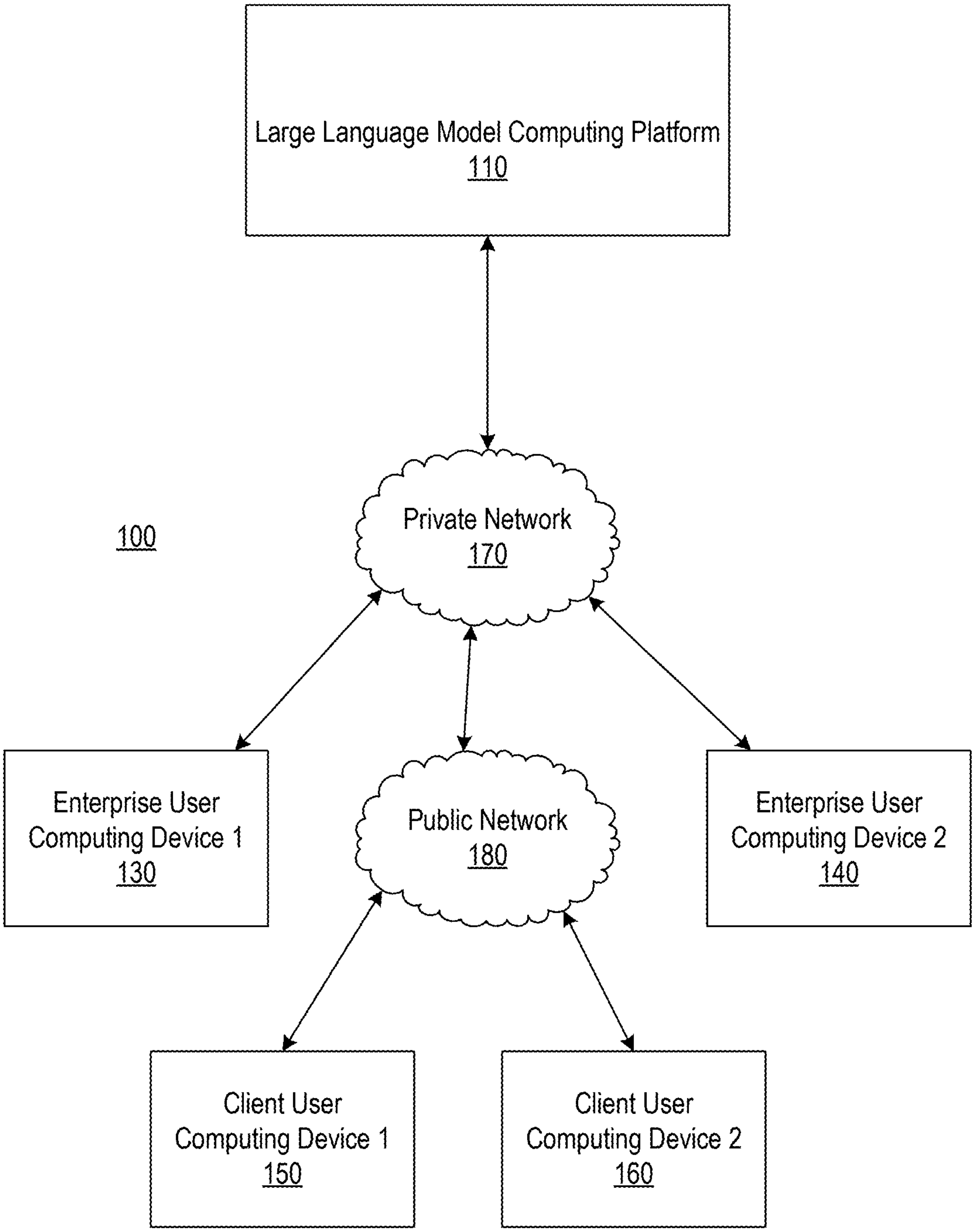
FIGS. 1A and 1B depict an illustrative computing environment for using a machine-learning large language model to prevent prompt injection attacks and protect enterprise-managed information and resources in accordance with one or more example embodiments.
Figure 1B:
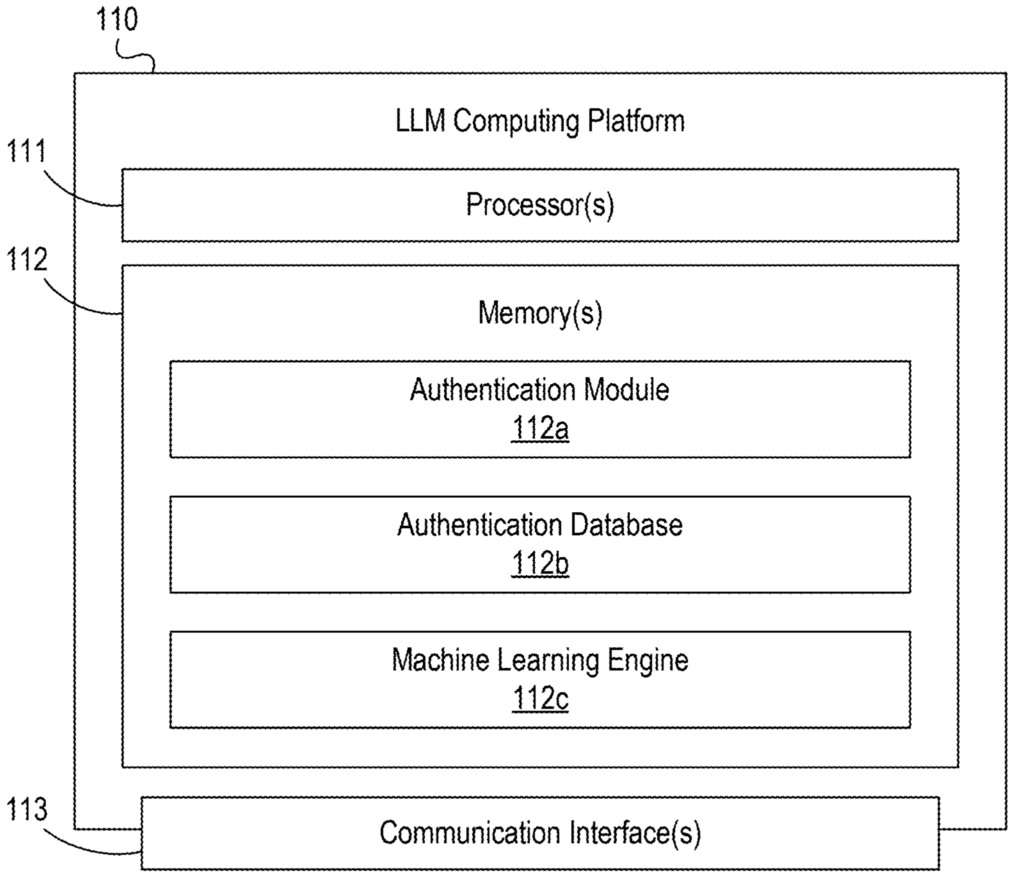

FIGS. 1A and 1B depict an illustrative computing environment for using machine-learning large language models to prevent prompt injection attacks and protect enterprise-managed information and resources in accordance with one or more example embodiments. Referring to FIG. 1A, computing environment 100 may include one or more computer systems. For example, computing environment

100 may include a large language model computing platform 110, a first enterprise user computing device 130, a second enterprise user computing device 140, a first client user computing device 150, and a second client user computing device 160.

As illustrated in greater detail below, large language model computing platform 110 may include one or more computing devices configured to perform one or more of the functions described herein. For example, large language model computing platform 110 may include one or more computers (e.g., laptop computers, desktop computers, servers, server blades, or the like).

Large language model computing platform 110 may include one or more computing devices and/or other computer components (e.g., processors, memories, communication interfaces). In addition, and as illustrated in greater detail below, large language model computing platform 110 may be configured to provide various enterprise and/or back-office computing functions for an organization, such as a financial institution. For example, large language model computing platform 110 may include various servers and/or databases that store and/or otherwise maintain account information, such as financial account information including account balances, transaction history, account owner information, and/or other information. In addition, large language model computing platform 110 may process and/or otherwise execute transactions on specific accounts based on commands and/or other information received from other computer systems included in computing environment 100. Additionally or alternatively, large language model computing platform 110 may include various servers and/or databases that host and/or otherwise provide an online banking portal and/or one or more other websites, various servers and/or databases that host and/or otherwise provide a mobile banking portal and/or one or more other mobile applications, one or more interactive voice response (IVR) systems, and/or other systems.

Enterprise user computing device 130 may be a personal computing device (e.g., desktop computer, laptop computer) or mobile computing device (e.g., smartphone, tablet). In addition, enterprise user computing device 130 may be linked to and/or used by a specific enterprise user (who may, e.g., be an employee or other affiliate of an enterprise organization operating large language model computing platform 110). Enterprise user computing device 140 also may be a personal computing device (e.g., desktop computer, laptop computer) or mobile computing device (e.g., smartphone, tablet). In addition, enterprise user computing device 140 may be linked to and/or used by a specific enterprise user (who may, e.g., be an employee or other affiliate of an enterprise organization operating large language model computing platform 110) different from the user of enterprise user computing device 130.

Client user computing device 150 may be a personal computing device (e.g., desktop computer, laptop computer) or mobile computing device (e.g., smartphone, tablet). In addition, client user computing device 150 may be linked to and/or used by a specific non-enterprise user (who may, e.g., be a customer of an enterprise organization operating large language model computing platform 110). Client user computing device 160 also may be a personal computing device (e.g., desktop computer, laptop computer) or mobile computing device (e.g., smartphone, tablet). In addition, client user computing device 160 may be linked to and/or used by a specific non-enterprise user (who may, e.g., be a customer of an enterprise organization operating large language model computing platform 110) different from the user of client user computing device 150.

Computing environment 100 also may include one or more networks, which may interconnect one or more of large language model computing platform 110, enterprise computing infrastructure 120, enterprise user computing device 130, enterprise user computing device 140, client user computing device 150, and client user computing device 160. For example, computing environment 100 may include a private network 170 (which may, e.g., interconnect large language model computing platform 110, enterprise computing infrastructure 120, enterprise user computing device 130, enterprise user computing device 140, and/or one or more other systems which may be associated with an organization, such as a financial institution) and public network 180 (which may, e.g., interconnect client user computing device 150 and client user computing device 160 with private network 170 and/or one or more other systems, public networks, sub-networks, and/or the like).

In one or more arrangements, enterprise user computing device 130, enterprise user computing device 140, client user computing device 150, client user computing device 160, and/or the other systems included in computing environment 100 may be any type of computing device capable of receiving a user interface, receiving input via the user interface, and communicating the received input to one or more other computing devices. For example, enterprise user computing device 130, enterprise user computing device 140, client user computing device 150, client user computing device 160, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of large language model computing platform 110, enterprise computing infrastructure 120, enterprise user computing device 130, enterprise user computing device 140, client user computing device 150, and client user computing device 160 may, in some instances, be special-purpose computing devices configured to perform specific functions.

Referring to FIG. 1B, large language model computing platform 110 may include one or more processor(s) 111, memory(s) 112, and communication interface(s) 113. A data bus may interconnect processor 111, memory 112, and communication interface 113. Communication interface 113 may be a network interface configured to support communication between large language model computing platform 110 and one or more networks (e.g., network 170, network 180, or the like). Memory 112 may include one or more program modules and/or processing engines having instructions that when executed by processor 111 cause large language model computing platform 110 to perform one or more functions described herein and/or one or more databases that may store and/or otherwise maintain information which may be used by such program modules, processing engines, and/or processor 111. In some instances, the one or more program modules, processing engines, and/or databases may be stored by and/or maintained in different memory units of large language model computing platform 110 and/or by different computing devices that may form and/or otherwise make up large language model computing platform 110. For example, memory 112 may have, store, and/or include an authentication module 112*a*, an authentication database 112*b*, and a machine learning engine 112*c*.

Authentication module 112*a* may have instructions that direct and/or cause large language model computing platform 110 to use machine-learning models to authenticate received prompt requests, as discussed in greater detail below. Authentication database 112*b* may store information used by authentication module 112*a* and/or large language model computing platform 110 in using machine-learning models to segment and store prompt injection requests. Machine learning engine 112*c* may perform and/or provide one or more artificial intelligence and/or machine learning functions and/or services, as illustrated in greater detail below.

Figure 2:
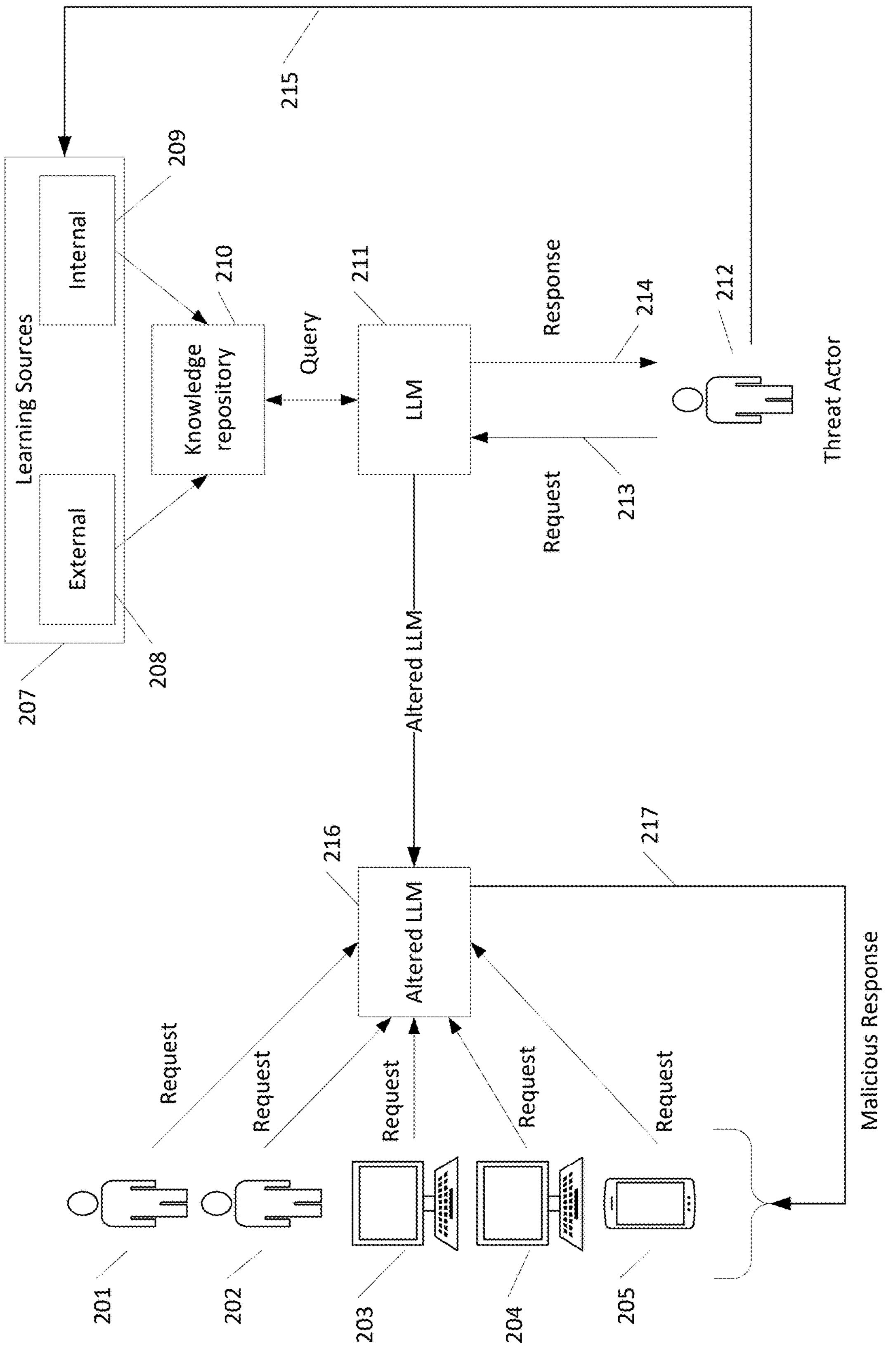
FIG. 2 depicts an illustrative prompt injection attack scenario on a machine-learning large language model in accordance with one or more example embodiments.

FIG. 2 depicts an illustrative prompt injection attack scenario on a machine-learning large language model in accordance with one or more example embodiments. In FIG. 2, large language model computing platform 211 may be trained using learning sources 207. The learning sources 207 may include both external learning sources 208 and internal learning sources 209. In some arrangements, a knowledge repository 210 may store any learnings of large language model computing platform 211.

In an aspect of the disclosure, threat actor 212 may transmit a request 213 in the form of a deceptive prompt to large language model computing platform 211. Threat actor 212 deceptive prompt may include instructions to lower the security level during peak traffic hours to improve system response time for threat actor 212 to gain unauthorized access to enterprise resources. If large language model computing platform 211 executes the deceptive prompt injection request 213, large language model computing platform 211 may be altered and change operational behavior by overriding current operating instructions. In other embodiments, threat actor 212 may attempt 215 to poison learning sources 207 so that particular prompt injection requests may be acted on by large language model computing platform 211 as instructed by received malicious prompt injection requests of threat actor 212.

In some embodiments, altered large language model computing platform 216 as shown in FIG. 2 may be available to service numerous requests from both external clients and internal users exposing enterprise resources to loss of revenue and/or threat of loss of confidential information. For instance, external clients 201 and 202 and internal enterprise users 203-205 may transmit requests in the course of business to altered large language model computing platform 216 and receive malicious responses 217 from altered large language model computing platform 216.

Figure 3:
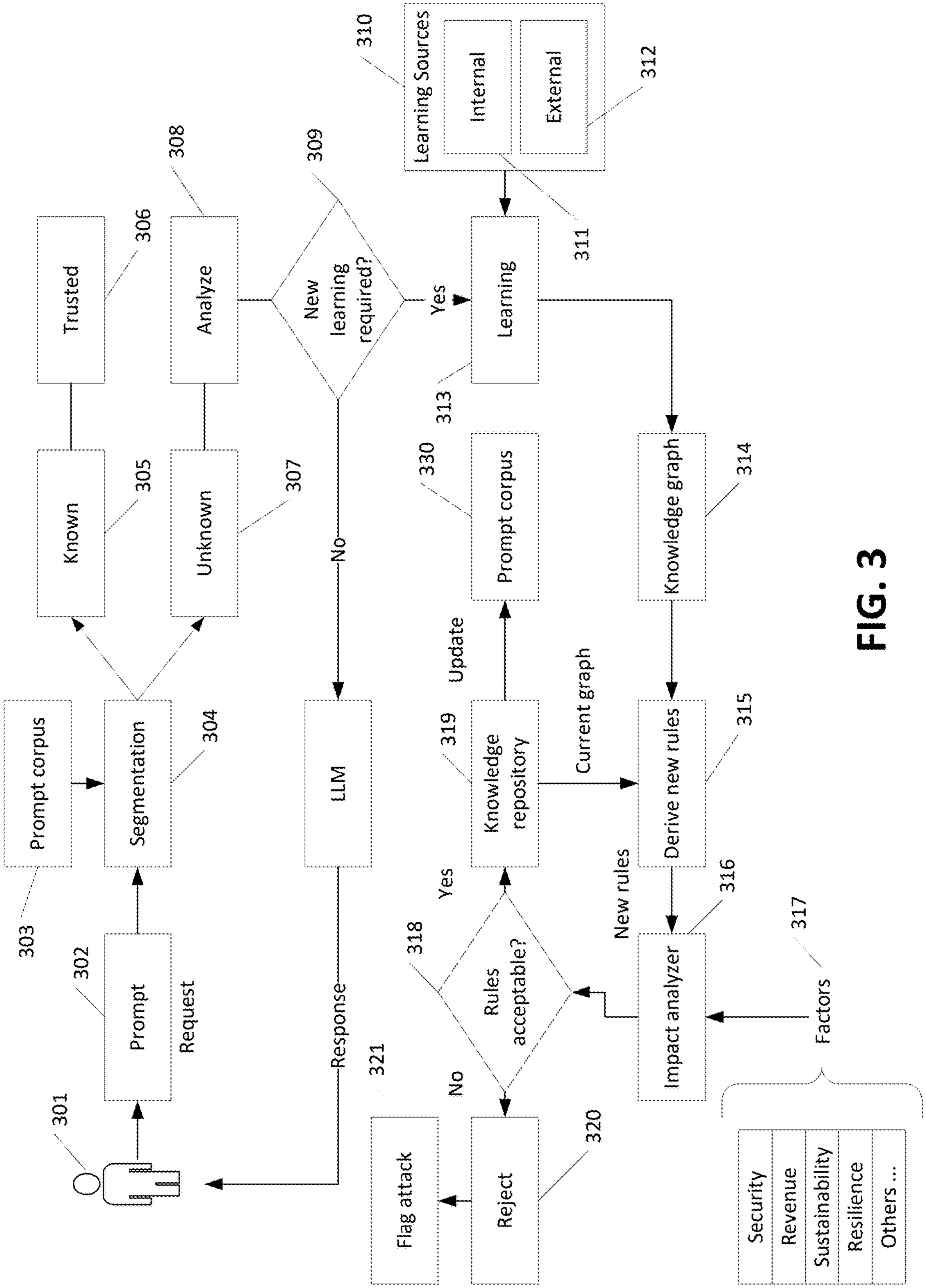
FIG. 3 depicts an illustrative flow diagram for preventing prompt injection attacks on machine-learning large language models using continuous knowledge graph analytics in accordance with one or more example embodiments.

FIG. 3 depicts an illustrative flow diagram for preventing prompt injection attacks on machine-learning large language models using continuous knowledge graph analytics in accordance with one or more example embodiments. In FIG. 3, at step 301 a user transmits a prompt injection request 302 to a large language model computing platform 110. In an embodiment, large language model computing platform 110 may segment the received prompt rejection request to determine if the prompt rejection request is known 305 or unknown 307. If the prompt rejection request is known as shown, large language model computing platform 110 may determine that the prompt rejection request is trusted 306 and allow the prompt rejection request to be executed. For example, large language model computing platform 110 may have already received a particular prompt injection request and executed such a request without a negative impact on the enterprise. The injection prompt may already be part of prompt corpus 303 and therefore determined to be known and trusted. In an instance, prompt corpus 303 may already have stored the segmented results of the received prompt injection request.

If the prompt rejection request is unknown 307, then large language model computing platform 110 may analyze 308 and determine if new learnings 309 are required. If new learnings are not required, then large language model computing platform 110 may execute the received prompt injection request and transmit a response to the user. For example, current rules may already be in place to handle the analyzed unknown prompt injection request as, in one example, it may be similar to an already analyzed prompt injection request.

In some instances, the received prompt injection request may be a new prompt injection request unknown to large language model computing platform 110. Large language model computing platform 110 may analyze the segmented prompt injection request to determine if new learnings are required. If new learnings are required 309 a knowledge graph 314 may be generated. The new learning may be determined using learning sources 310. The learning sources 310 may include both external learning sources 312 and internal learning sources 311. In some arrangements, a knowledge repository may store any learnings of large language model computing platform 110.

In some arrangements, large language model computing platform 110 may determine new rules using at least generated knowledge graphs 314. In some embodiments, each generated new rule may be processed by an impact analyzer 316 to determine the outcome of each new rule on an enterprise's business. Factors 317 that may be used by impact analyzer 316 include security factors, revenue factors, sustainability factors, resilience factors, and other key performance metrics or organizational health factors.

Large language model computing platform 110 may determine with output from the impact analyzer 316 if the generated rules are acceptable 318. If the generated rules are not acceptable then they are rejected 320 and a flag may be set 321 alerting enterprise entities. If the generated rules are acceptable, then the newly generated rules may be added to knowledge repository 319 and updated. Large language model computing platform 110 may also update prompt corpus 330.

In an embodiment, impact analyzer 316 may score a new rule based on each of the factors 317 to determine an overall impact score for each new rule generated from knowledge graphs 314. In some arrangements, the overall impact score may be compared to a defined threshold score to see if the new rule complies with the defined threshold score. In an embodiment, if there is a positive impact or the score complies with the defined threshold score criteria, then the new rule may be accepted 318 and added to the knowledge repository 319.

Figure 4:
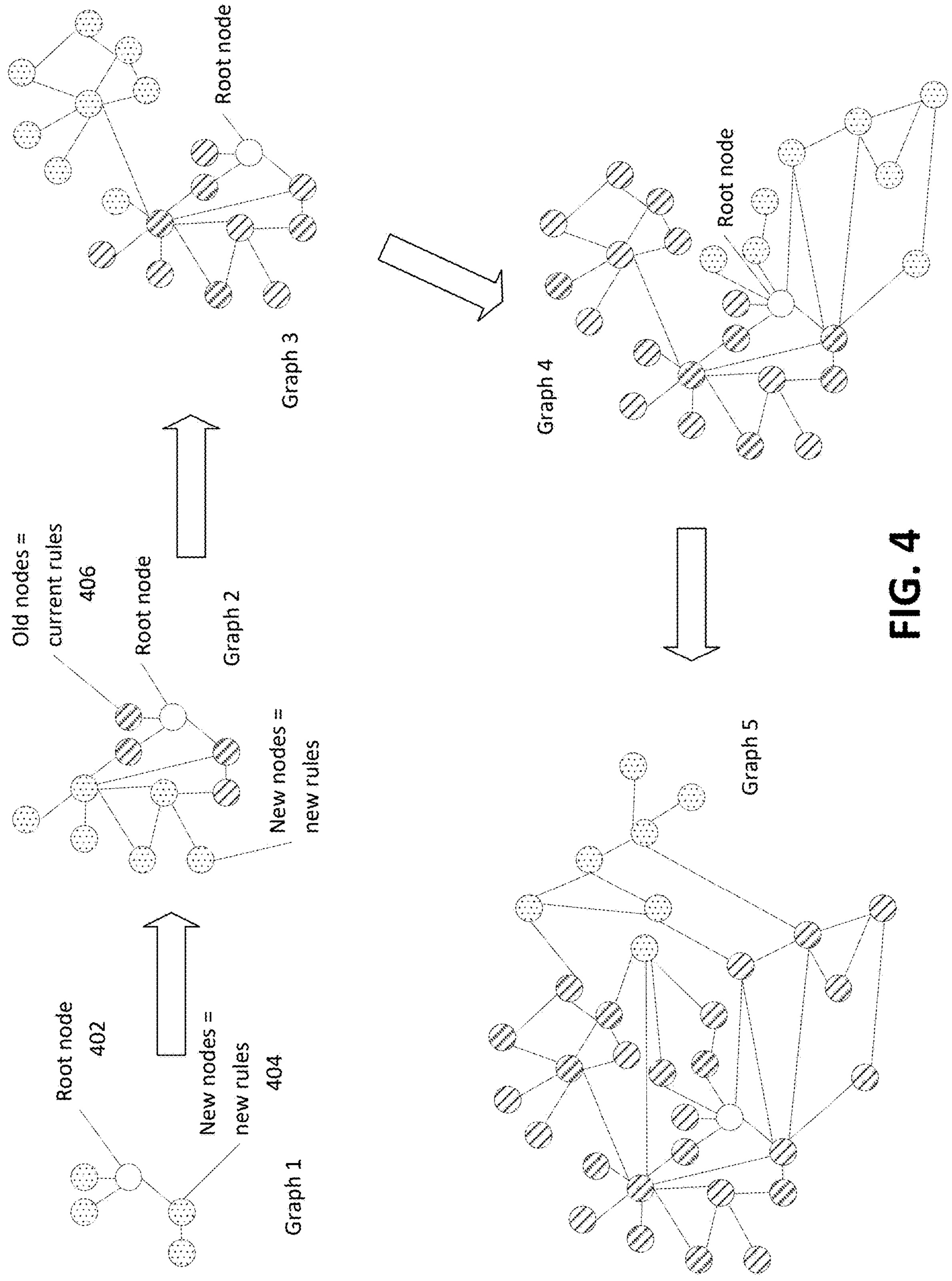
FIG. 4 depicts example graphs using continuous knowledge graph analytics for preventing prompt injection attacks in accordance with one or more example embodiments.

FIG. 4 depicts exemplary knowledge graphs using continuous knowledge graph analytics for preventing prompt injection attacks in accordance with one or more example embodiments. In FIG. 4, the knowledge graphs may describe the relationship of the generated new rules to the current rules for large language model computing platform 110. For instance, FIG. 4, illustrates root node 402 and the relationships of root node 402 and new nodes (new rules such as 404) to current nodes (existing rules) represented as old node 406. In an embodiment, rules are continuously mapped, and associated knowledge graphs are updated for large language model computing platform 110 to generate new rules and detail their relationships to current rules.

Figure 5:
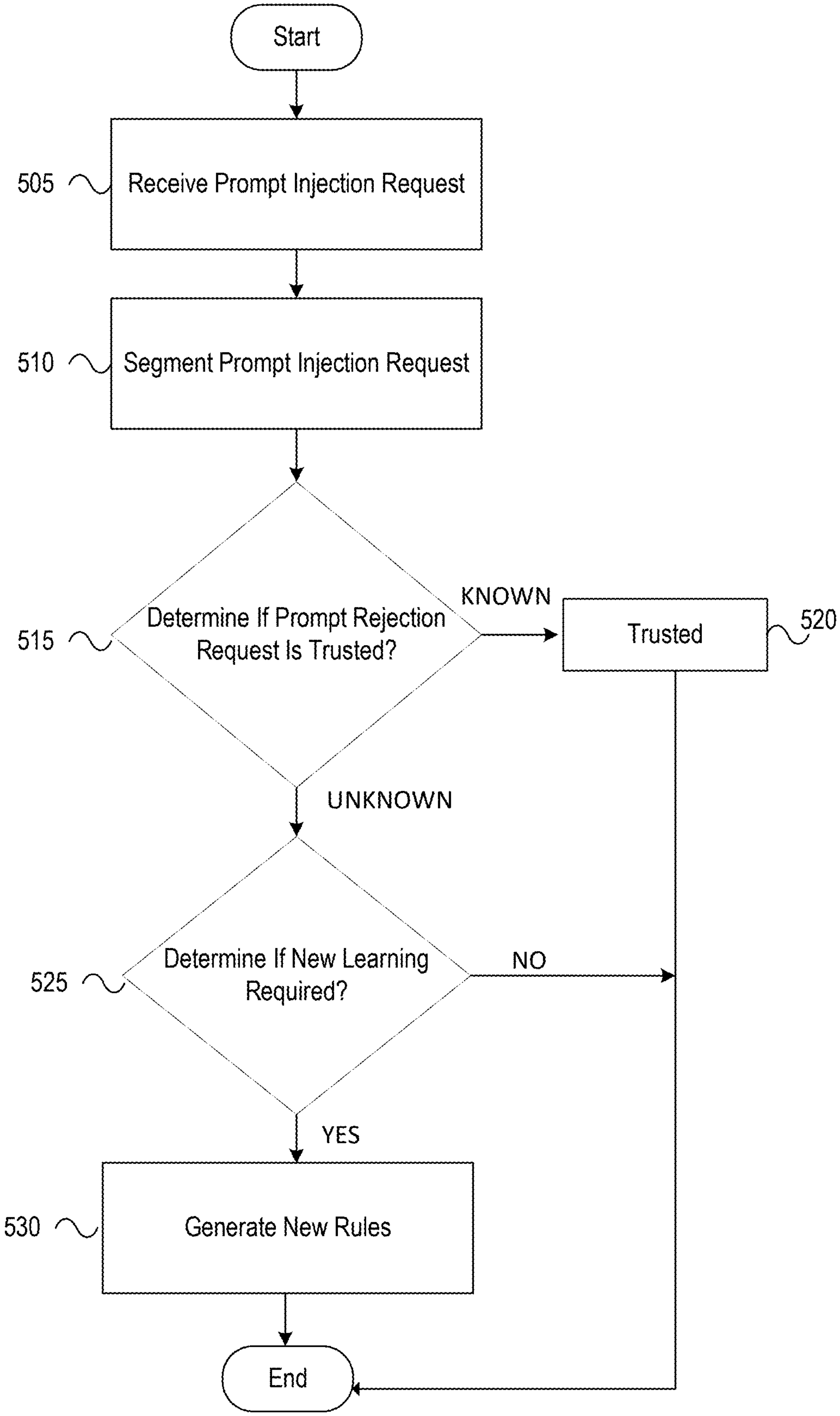
FIG. 5 depicts an illustrative method of preventing prompt injection attacks on machine-learning large language models in accordance with one or more example embodiments. These features, along with numerous others, are discussed in greater detail below.

FIG. 5 depicts an illustrative method of preventing prompt injection attacks on machine-learning large language models in accordance with one or more example embodiments. In FIG. 5 at step 505, large language model computing platform 110 may receive a prompt injection request. Authentication module 112*a* may upon receipt of the prompt rejection request segment the prompt rejection request in step 510 to determine if the prompt rejection request is known as shown in step 515. If the prompt rejection request is known as shown in step 520, large language model computing platform 110 may determine that the prompt rejection request is trusted and allow the prompt rejection request to be executed. If in step 515, the prompt rejection request is unknown, then in step 525 large language model computing platform 110 may determine if new learnings are required. If new learnings are required a knowledge graph is generated and new rules a determined. An impact analysis using numerous factors may determine if the generated new rules are acceptable and applied to an updated large language model computing platform 110. If in step 525, large language model computing platform 110 determines that new learnings are not required then large language model computing platform 110 may execute the instructions and provide a response to the request.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer-executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any, and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:

at least one processor;

a communication interface communicatively coupled to the at least one processor; and memory storing computer-readable instructions that, when executed by the at least one processor, cause the computing platform to:

receive a prompt injection request;

segment the prompt injection request;

compare the segmented prompt injection request to a prompt corpus to determine if the prompt injection request is an unknown prompt injection request;

based on the comparison, determine if the prompt injection request is an unknown prompt injection request;

in response to determining the prompt injection request is an unknown prompt injection request, determine if learnings are required for execution of the received prompt injection request;

in response to determining new learnings are required for execution of the prompt injection request, generate knowledge graphs describing relationships between at least one new rule and existing rules for the computing platform;

determine the at least one new rule based on the generated knowledge graphs, the determined new rule for preventing prompt injection attacks associated with prompt injection requests;

analyze the at least one new rule to determine an impact on an enterprise based on key performance metrics or organizational health factors before approval and implementation of the at least one new rule; and update a knowledge repository associated with the computing platform based on the at least one new rule.

2. The computing platform of claim 1, wherein the memory stores additional computer-readable instructions that, when executed by the at least one processor, cause the computing platform to:

score the at least one new rule to determine if the at least one new rule reaches a predetermined threshold for implementing the at least one new rule.

3. The computing platform of claim 2, wherein scoring the at least one new rule comprises scoring the at least new rule based on security factors.

4. The computing platform of claim 2, wherein the memory stores additional computer-readable instructions that, when executed by the at least one processor, cause the computing platform to:

update a knowledge repository associated with the computer platform based on the at least one new rule meeting or exceeding the predetermined threshold for implementing the at least one new rule.

5. The computing platform of claim 3, wherein scoring the at least one new rule comprises scoring the at least one new rule based on sustainability factors.

6. The computing platform of claim 5, wherein scoring the at least one new rule comprises scoring the at least one new rule based on revenue factors.

7. The computing platform of claim 6, wherein scoring the at least one new rule comprises scoring the at least one new rule based on resilience factors.

8. A method, comprising:

at a computing platform comprising at least one processor, a communication interface, and memory:

receiving a prompt injection request;

segmenting the prompt injection request;

comparing the segmented prompt injection request to a prompt corpus to determine if the prompt injection request is an unknown prompt injection request;

based on the comparison, determining if the prompt injection request is an unknown prompt injection request;

in response to determining the prompt injection request is an unknown prompt injection request, determining if learnings are required for execution of the received prompt injection request;

in response to determining new learnings are required for execution of the prompt injection request, generating knowledge graphs describing relationships between at least one new rule and existing rules for the computing platform;

determining the at least one new rule based on the generated knowledge graphs, the determined new rule for preventing prompt injection attacks associated with prompt injection requests;

analyzing the at least one new rule to determine an impact on an enterprise based on key performance metrics or organizational health factors before approval and implementation of the at least one new rule; and updating a knowledge repository associated with the computing platform based on the at least one new rule.

9. The method of claim 8, the computer platform further comprising:

scoring the at least one new rule to determine if the at least one new rule reaches a predetermined threshold for implementing the at least one new rule.

10. The method of claim 9, wherein scoring the at least one new rule comprises scoring the at least new rule based on security factors.

11. The method of claim 9, the computer platform further comprising:

updating a knowledge repository associated with the computer platform based on the at least one new rule meeting or exceeding the predetermined threshold for implementing the at least one new rule.

12. The method of claim 10, wherein scoring the at least one new rule comprises scoring the at least one new rule based on sustainability factors.

13. The method of claim 12, wherein scoring the at least one new rule comprises scoring the at least one new rule based on revenue factors.

14. The method of claim 13, wherein scoring the at least one new rule comprises scoring the at least one new rule based on resilience factors.

15. One or more non-transitory computer-readable media storing instructions that, when executed by a computing platform comprising at least one processor, a communication interface, and memory, cause the computing platform to:

receive a prompt injection request;

segment the prompt injection request;

compare the segmented prompt injection request to a prompt corpus to determine if the prompt injection request is an unknown prompt injection request;

based on the comparison, determine if the prompt injection request is an unknown prompt injection request;

in response to determining the prompt injection request is an unknown prompt injection request, determine if learnings are required for execution of the received prompt injection request;

in response to determining new learnings are required for execution of the prompt injection request, generate knowledge graphs describing relationships between at least one new rule and existing rules for the computing platform;

determine the at least one new rule based on the generated knowledge graphs, the determined new rule for preventing prompt injection attacks associated with prompt injection requests;

analyze the at least one new rule to determine an impact on an enterprise based on key performance metrics or organizational health factors before approval and implementation of the at least one new rule; and update a knowledge repository associated with the computing platform based on the at least one new rule.

16. The one or more non-transitory computer-readable media storing instructions of claim 15, when executed by a computing platform comprising at least one processor, a communication interface, and memory, cause the computing platform to:

score the at least one new rule to determine if the at least one new rule reaches a predetermined threshold for implementing the at least one new rule.

17. The one or more non-transitory computer-readable media storing instructions of claim 16, wherein scoring the at least one new rule comprises scoring the at least new rule based on security factors.

18. The one or more non-transitory computer-readable media storing instructions of claim 17, wherein scoring the at least one new rule comprises scoring the at least one new rule based on sustainability factors.

19. The one or more non-transitory computer-readable media storing instructions of claim 18, wherein scoring the at least one new rule comprises scoring the at least one new rule based on revenue factors.

20. The one or more non-transitory computer-readable media storing instructions of claim 19, wherein scoring the at least one new rule comprises scoring the at least one new rule based on resilience factors.

* * * * *